ANALOG COMPUTER

Filed Jan. 13, 1959 4 Sheets-Sheet 1

INVENTORS:
WILLIAM C. ELMORE
CLIFFORD E. McCARTY
BY Howson & Howson
ATTYS.

INVENTORS:
WILLIAM C. ELMORE
CLIFFORD E. McCARTY
BY Howson & Howson
ATTYS.

INVENTORS:
WILLIAM C. ELMORE
CLIFFORD E. McCARTY
BY Howson & Howson
ATTYS.

INVENTORS:
WILLIAM C. ELMORE
CLIFFORD E. McCARTY
BY Howson & Howson
ATTYS.

United States Patent Office 2,934,273

Patented Apr. 26, 1960

2,934,273

ANALOG COMPUTER

William C. Elmore, Swarthmore, and Clifford E. McCarty, Ridley Park, Pa., assignors to Scott Paper Company, Chester, Pa., a corporation of Pennsylvania

Application January 13, 1959, Serial No. 786,565

48 Claims. (Cl. 235—185)

This application is a continuation-in-part of application Serial Number 640,976, filed February 18, 1957, now abandoned.

This invention relates to a simple analog computer for solving problems having to do with change or exchange in a manner which is most efficient and/or least costly, where the possible changes may be expressed as unidirectional changes from one condition or position to another. Generally speaking, the computer is capable of solution of problems of this general sort by selection of power as the analog of the quantity to be minimized and selection of other parameters according to their relative natures if the problem can be set up as linear simultaneous equations. It is characteristic of the computer that it is capable of making solutions directly and without the use of iterative steps.

In its most general form, the analog computer of the present invention consists of a network having two types of terminals which provide network nodes. The internal part of the network between the input and output terminals or nodes consists of flow paths from various input to various output terminals or nodes. As a practical matter, there is a flow path between each input and each output node which includes a switch or valve so that the path may be discontinued at will or effectively provided with an infinite impedance. Each flow path has a potential-producing element, and enough of the flow paths have flow rectifying elements to prevent circulating currents within any of the loops internal of (and including) the input and output terminals or nodes which might otherwise be produced by the potential-producing element. External of the nodes, i.e., in the external part of the network, there is at least one flow generator connected to at least one of the output nodes. Normally, an external return flow path is required to keep input and output equal and this return flow path connects the flow generators connected to nodes and any nodes not externally connected to a generator.

The computer of the present invention is preferably provided in the form of an array of numbers or matrix having many input and many output nodes, flow paths of the type required between each input and each output terminal and a constant flow generator between a common external circuit connecting output back to input terminals and each of the input and output terminals. Each of the internal flow paths is provided with a potential producing element, an element limiting flow in the path to one direction and a switch or valve which may open the path to prevent flow thus effectively eliminating it from the computer set-up for a particular problem. Each constant flow generator is also preferably provided with means for effectively eliminating it from the computer set-up for a particular problem. Meters may or may not be included as part of the permanent circuitry, but some permanent means preferably switchable into and out of the flow path is associated or associable with each flow path in order to measure the flow therein which ordinarily has an important analog significance in connection with the problem being solved. The selection of the components used in a particular problem will depend upon the nature of that problem.

The computer of the present invention is capable of solution of problems of many types. Typical of the problems it can solve are the so-called "linear transportation" problem and the so-called "scheduling problem." The computer set-up for solution of each of these problems will be considered by way of example of the utility of the computer of the present invention.

In its most simple form, the transportation problem may be stated as follows:

Given a specific number of supply points, and a specific number of destination points, and the unit cost of transfer from each of the supply points to each of the destination points, "what are the quantities which should be transferred along the various supply routes in order to make total cost of transfer a minimum?" This problem may be stated mathematically using the following symbols:

$P'_i$=quantity available at the $i$th supply point
$U_j$=quantity required at the $j$th destination
$t_{ij}$=quantity transferred from $i$ to $j$
$c_{ij}$=unit cost of this transfer (e.g., freight, or freight and manufacturing cost, or freight, manufacturing, and raw material unit (direct and indirect) costs)
$T$=total goods transported
$C$=Total transportation cost
$m$=number of supply points
$n$=number of destination points Certain facts are known and these constitute limitations or restraints. For example, it is known that the sum of the quantities transferred along all of the routes from a given supply point must equal all of the quantity available at that supply point assuming that all of the goods are transported. This can be expressed mathematically as follows:

$$P'_i=\sum_j t_{ij}$$

$$(i=1\ .\ .\ .\ m)$$

It is also known that the total number of goods transported to a certain destination must equal the quantity of goods required at that destination point if the need is to be satisfied.

This can be expressed mathematically as follows:

$$U_j=\sum_i t_{ij}$$

$$(j=1\ .\ .\ .\ n)$$

Also true is the fact that the total goods transported (T) must be equal to the sum of all the goods available at all the supply points which must be equal to the sum of all the goods required at all the destination points and which, in turn, must be equal to the sum of all the goods transported over all the possible transportation paths. This can be expressed mathematically as follows:

$$T=\sum_i P'_i=\sum_j U_j=\sum_{i,j} t_{ij}$$

Each of the above equations holds true where the total goods transported is equal to or greater than zero, that is, where there is no shipment from destination points back to supply points.

The objective of the problem is to minimize the total cost which may be represented by C. Thus, an expression of the objective may be written as follows:

$$C=\sum_i\sum_j c_{ij}t_{ij}=\text{minimum}$$

It has been possible by a long tedious process to obtain iterative solution of this equation, but, even with the aid of expensive and highly efficient electronic computers, it usually requires long periods of work to arrive at the desired solution.

Applying the problem to the computer, it will be observed from the above that the supplies and demands are simulated by the nodes and their associated external elements and routes are simulated by the flow paths between the nodes. Constant flow generators are provided at all or at all but one of the input or output nodes to establish certain limitations on the problem and permit a solution of the problem. The flow of each input constant flow generator is set equal to the quantity available at that supply point. Similarly, the flow of each output flow generator is set equal to the quantity required at that destination. These generators are so adjusted that the output of the generators at the supply points equals the output of generators at the demand points. The elimination of a single flow generator at either a supply or a demand point does not change the situation from that in which constant flow generators are provided at all input and output points. A flow resisting element, which may be a variable resistance element, may be substantial for a generator to provide a means for compensating for inaccuracies in the settings of the flow generator.

Alternatively, to solve problems wherein as few as one supply point is restricted to the quantity available at that supply point, or as few as one destination point is restricted to the quantity required at that destination point, fewer constant current generators are required to restrict the product flow from the supply points, or the product flow to the destination points, as the case may be.

In the embodiment of the present invention, shown in Figure 1 the linear transportation problem may be described in slightly different words. It concerns an analog computer for determining optimum distribution of goods in transit along alternative routes of transportation from supply to destination points at minimum overall expense. In order to accomplish this, constant flow devices are used to simulate supply points and destination points, and flow paths of negligible resistance are employed to connect the supply and destination points. The constant flow devices are arranged so that the direction of flow is always the same in both the supply and destination points, and each of the conductive paths has means to limit the flow to one direction. Additionally, each conductive path has a potential producing device. The flow at the supply and destination points is adjustable in proportion to the supply of units to be shipped at each supply point and in proportion to the demand for those units at each destination point, respectively, and the potential in each flow path is adjustable in proportion to the cost of shipping from the point of shipment to the point of destination via that route. Adjustability of the devices or components is provided in all preferred embodiments of the present invention.

The sequential scheduling problem may be stated as follows by way of example:

Given a specific number of products which must be manufactured and the cost of changing from one product to any other product, what is the preferred sequence of manufacturing in order to reduce cost to a minimum where all products will be manufactured. This problem may be stated mathematically using the following symbols:

$S_i$=the number of changes from product $i$
$D_j$=the number of changes from product $j$
$x_{ij}$=the change from product $i$ to product $j$, e.g., a variable having either the value zero or a positive number. These values indicate no change or a change, respectively, from product $i$ to product $j$.
$c_{ij}$=the cost of changing from an $i$ product to a $j$ product
$C$=the total cost of the entire scheduling sequence.

Certain facts constituting limitations or restraints are known. For example, it is known that the number of changes from product $i$ is equal to the sum of the changes made to product $j$ from product $i$. Similarly, the number of changes from product $j$ is equal to the sum of the changes made to product $i$ from product $j$. These expressions can be written as follows:

$$S_i=\sum_j x_{ij}$$

$$D_j=\sum_i x_{ij}$$

As in the linear transportation problems, the object of the problem is to minimize total cost and this can be represented by the following expression $$C=\sum_{ij} c_{ij}x_{ij}=\text{minimum}$$

It will be immediately apparent that it is not reasonable to change from any one product back to itself. Thus all such changes may be eliminated from the analog by opening or eliminating these flow paths. Moreover, there will be as many products from which change is to be made as there are products to which change can be made.

Applying the problem to the computer, it will be observed that the number of products from which changes can be made may be simulated by input nodes and their associated flow generators and the number of products to which changes can be made may be simulated by the output nodes and their associated flow generators. The flow generators are all set to provide specified flows, thereby to simulate the requirements for changes along one or more of the possible routes of the internal network in each of which routes an opposing potential (which simulates cost) is provided. As in the linear transportation problem, elements are provided in each of the paths to assure that flow is only in one direction, i.e., from the input node.

Our present invention provides a simple computer for quickly providing a unique solution of the linear transportation problem, the scheduling problem and other problems. The apparatuses we have developed are electrical networks which we have found to provide the analog of the linear transportation equation and similar problems and a solution of these problems, but it was early recognized that equally good computers were possible using pneumatic mechanical or hydraulic systems. Any of these systems comprise simple uncomplicated assemblies composed of standard relatively simple individual components. Moreover, despite their simplicity, their accuracy has been demonstrated to be substantially greater than the initial accuracy attained with prior art processes involving complex computers and computations, and this accuracy is achieved directly using only one simple step: the preliminary adjustment of the components to suit the limitations of a particular problem as opposed to a multiplicity of relatively involved iterative steps. Furthermore, a computer of the present invention because of its simplicity is easily and inexpensively manufactured.

For a better understanding of the present invention specific reference will be made to specific electrical and hydraulic analog computers which are representative of the problem. It will be understood, of course, that these computers may be modified, and ordinarily will be modified, to suit the requirements of a particular problem under the specific transportation conditions which exist and that, therefore, the computers shown are intended to be illustrative rather than limiting in nature. Referring to the accompanying drawings.

Figure 1:
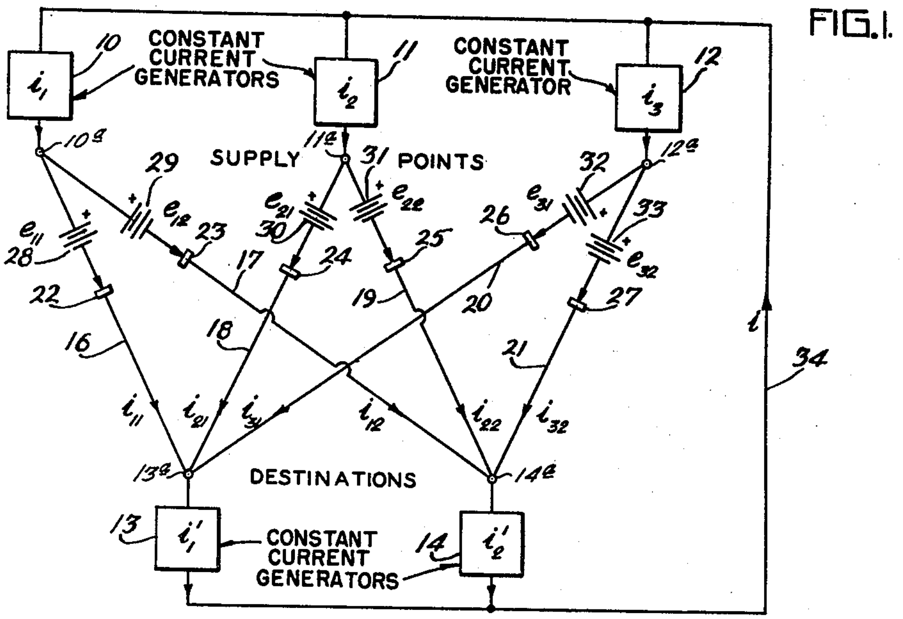
Fig. 1 is a schematic diagram of a computer of the present invention employing a D.C. electrical network adapted for solution of a problem in the form of the linear transportation problem.

While in practical embodiments, a computer in accordance with the present invention would be made with a great many input and output nodes to make it more uniformly adaptable to practical problems of great complexity, for the purpose of understanding the invention a matrix of three input nodes and two output nodes will be considered in connection with the linear transportation problem, and a matrix of three input nodes and three output nodes will be considered in connection with the sequential scheduling problem. If, for example, a computer employing a forty by forty matrix of input and output terminals were to be used in solving the problems involving a few input and output nodes, only the number of constant flow generators required to represent the few supply points selected and the few destination points selected would be used, and the switches or valves in the flow paths other than those between the selected supply and destination points would be set to open the unused flow paths and effectively remove them from the network. It should be borne in mind that the representative networks selected for illustration herein are among the simplest possible networks which might be used to explain the use of the computer adequately and to solve the particular problem involved.

Considering first the linear transportation problem and the electrical computers shown in Figs. 1 and 2, the electrical terms for both arrangements are generally defined with respect to the original problem statement as follows:

$i_i=P_i=$quantity available at the $i$th supply point
$i'_j=U_j=$quantity available at the $j$th destination
$i_{ij}=t_{ij}=$quantity transferred from $i$ to $j$
$e_{ij}=c_{ij}=$unit cost of the transfer (e.g., freight, and manufacturing cost; freight, manufacturing and raw materials (direct and indirect) costs, etc.)
$I=T$ where:

$$T=\sum_i P'_i=\sum_j U_j=\sum_{i,j} t_{ij}$$

and $$I=\sum_i i_i=\sum_j i'_j=\sum_{i,j} i_{ij}$$

$P=C=$total cost of transporting all goods from supply points to destinations where:

$$C=\sum_{i,j} c_{ij}t_{ij}=\text{min.}$$

$$P=\sum_{i,j} e_{ij}i_{ij}=\text{min.}$$

These electrical equations may be shown to exist in the networks. Therefore, a synthesis of the network is desirable, and, inasmuch as the networks shown in Fig. 1 and Fig. 2 are merely representative of one problem where three supply and two destination points are employed, the synthesis might better be done in terms of any finite whole positive members, $m$ and $n$, of supply and destination points where any particular supply point is designated the $i$th and any particular destination point is designated the $j$th.

The synthesis of the networks can be understood by consideration of certain network theorems. Basic to the whole operation is Kirchhoff's first law which states that in an electrical network the sum of currents flowing to a junction point equals the sum of currents leaving the point. This law has particular significance at junction points represented by the output of the supply current generators ($i_i$) and the conductive paths where the current flowing into each junction from the generator must equal the currents flowing out through the various paths ($i_{ij}$) and at the junction points represented by the conductive paths and the input to the demand current generator ($i'_j$) where the currents flowing into each junction must equal the current flowing out to the current generator. Distribution of currents between supply and demand generators is determined by the potentials against which they must move. The currents are then clearly seen to be the analog of the units of material under consideration in the transportation problem and its flow requirements. This can be seen by expressions of Kirchhoff's law, as follows:

$$i_i=\sum_j i_{ij}$$

Figure 2:
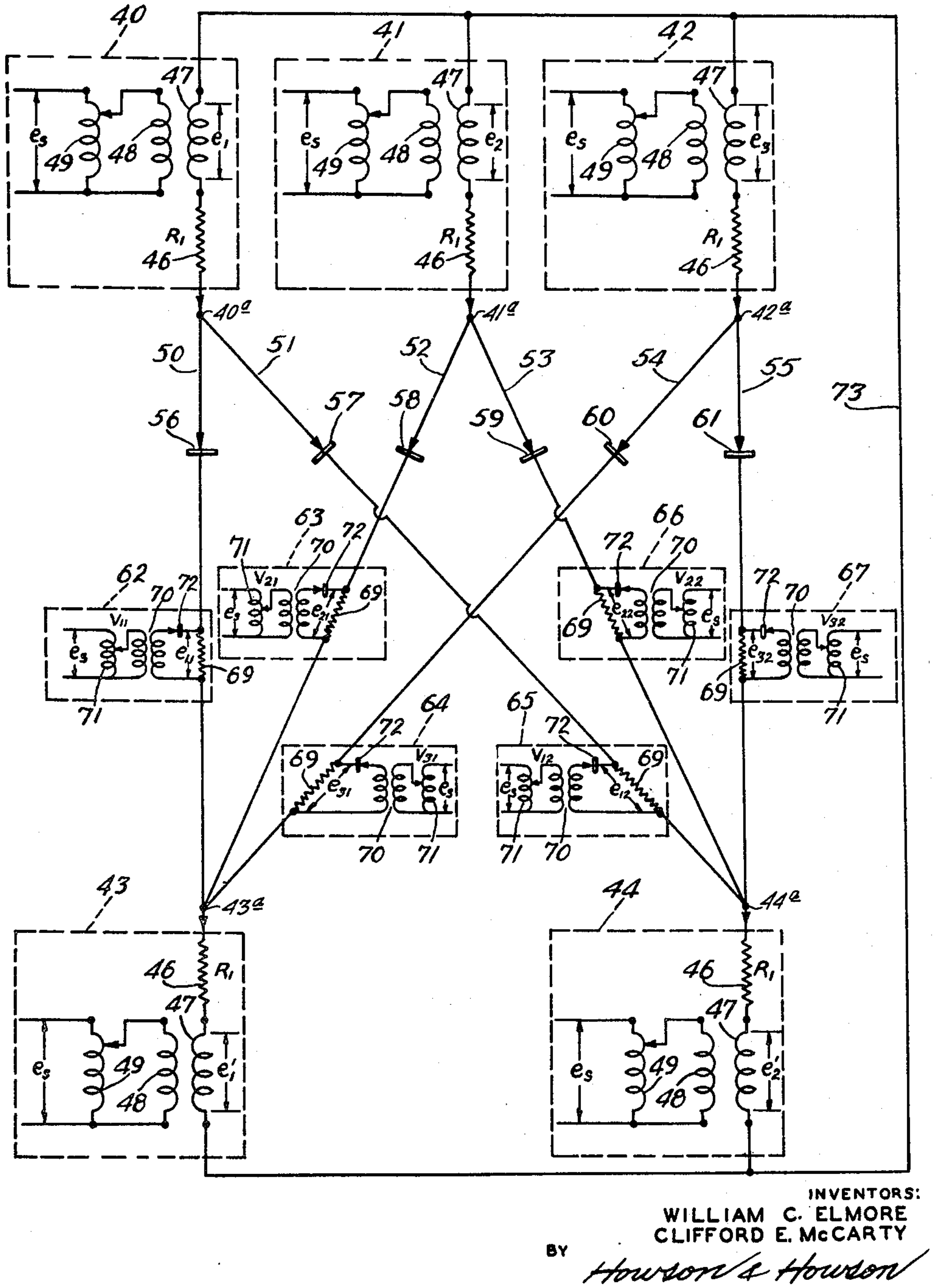
Fig. 2 is a schematic diagram of a computer of the present invention for solving the same problem as solved by the circuit of Fig. 1 but employing an A.C. electrical network.

($i=1, 2, 3$ in the computer of Fig. 1 and Fig. 2)

$$i'_j=\sum_i i_{ij}$$

($j=1, 2,$ in the computer of Fig. 1 and Fig. 2)

$$I=\sum_i i_i=\sum_j i'_j=\sum_{i,j} i_{ij}$$

where $i_{ij}\geq 0$.

With these equations established it is necessary to show that the function P, which is analogous to the total cost of transportation, is a minimum. Restating the problem in general form $$P=\sum_{i,j} e_{ij}i_{ij}=\text{min.}$$

To verify that P can be minimized, the general network theorem for the distribution of current in a network when voltages and resistances exist can be stated as:

$$F=\sum i_{ij}^2R_{ij}+2\sum_{i,j} i_{ij}e_{ij}$$

This function (F) is the quantity that is minimized in an electrical network when voltage sources and resistances are present in the network.

Two special cases of the function (F) exist.

(I) The first case is one in which the sum of the power due to the voltage sources in the paths is negligible or simply stated as:

$$\sum_{i,j} i_{ij}^2R_{ij}\gg 2\sum_{i,j} i_{ij}e_{ij}$$

then (F) becomes $$F=\sum i_{ij}^2R_{ij}=\text{min.}$$

Since the power in each path of the network is the product of the current squared and the resistance or $i^2$R, then the power of the total network is $$P=\sum_{i,j} i_{ij}^2R_{ij}$$

which is equal to the function F for the derived condition; or the power is $$P=\sum_{i,j} i_{ij}^2R_{ij}=\text{min.}$$

This shows that the power in an electrical network is a minimum when the sum of the power due to the voltage sources in the paths is much much less than the sum of the power dissipated by the resistances of the paths.

(II) The second case is one in which the resistance is negligible in each path or $$\sum_{i,j} i_{ij}^2 R_{ij} \ll 2\sum_{i,j} i_{ij}e_{ij}$$

then (F) becomes $$F = 2\sum_{i,j} i_{ij}e_{ij} = 2 \text{ power}$$

The sum of the products $i_{ij}e_{ij}$ is the power of the network and thus a special case has been derived where $$P = \text{Power} = \sum_{i,j} i_{ij}e_{ij} \text{ is a minimum}$$

(the constant 2 is superfluous since twice the minimum of a function is a minimum).

The second case will be used for detailed explanation of the computer's operation. The general expression (F) and other specific cases of minimum power can be applied to the computers described with modification only to hardware and method of operation. From the second case.

$$P = \sum_{i,j} i_{ij}e_{ij} = \text{min.}$$

and in the analogous transportation problem C, or the total cost, would be minimized.

It should be noticed that a fixed amount of voltage may be added to all path voltages without upsetting the minimization of the total cost since $$\sum_{i,j} (e_{ij} \pm e_0) i_{ij} = P' \pm P_0 \text{ minimum}$$

$P_0$ is a fixed power defined as $P_0 = e_0 I$ where $e_0$ is the increased voltage per path and I is the total amount of current flowing into the network. It is obvious that this can be related to general notations to obtain $$\sum_{i,j} (c_{ij} \pm C_0) t_{ij} = C \pm C_0 T = \text{minimum}$$

where $C_0$ is a fixed cost added to the path costs and $C_0T$ is a total fixed cost. This fact can be used in a number of ways. For example, $C_0$ (and $e_0$) may be chosen to equal the smallest unit cost among the $c_{ij}$ and the negative sign chosen so that the computer makes use of the differential costs $c_{ij} - (c_{ij})$ min. This manipulation constitutes a shift in the unit origin which will, in effect, increase the percentage spread in unit costs and hence reduce the accuracy with which the cost E.M.F. $e_{ij}$ in the analog computer must be set.

Another example is the selection of $C_0$ to equal the largest $c_{ij}$ and again using the negative sign. In this case, the differential costs $c_{ij} - (c_{ij})$ max. are now all negative so that the currents $i_{ij}$ not identically zero pass through the sources of E.M.F. from minus to plus. This provision may have certain advantages in engineering design of a practical computer.

Another fact that should be realized is that the path voltages $e_{ij}$ can be increased by a fixed amount without destroying the computer's operation (i.e., the path voltages leading from one current generator). As an example (referring to Fig. 1) let $i_1$ be the current generator with the path voltages leading from $i_1$ changed to $$e'_{11} = e_{11} + e_0$$
$$e'_{12} = e_{12} + e_0$$

where $e_0$ is the increase in path voltage. The power due to the flow of $i_{11}$ and $i_{12}$ and voltages $e'_{11}$ and $e'_{12}$ can be expressed as $$P'_1 = \sum_j e_{1j} i_{1j} = P_1 + e_0 i_1$$

where $j = 1, 2$, $P_1$ is the power due to $e_{11}i_{11}$ and $e_{12}i_{12}$, and $e_0 i_1$, is the dissipation of power due to the increase in path voltage. The total power for the entire network is then $$P = \sum_j e_{1j} i_{1j} + \sum_{i,j} (e_{i+1,j})(i_{i+1,j}) = \text{minimum}$$

which can be written $$P = \sum_{i,j} e_{ij} i_{ij} + e_0 i_1 = \text{minimum}$$

This expression shows that the total power of the network has increased a fixed amount but that the expression for the total power is minimized. Relating this to the transportation type of problem $$C = D\sum_{i,j} C_{ij} t_{ij} + C_0 P'_1 = \text{minimum}$$

where $C_0$ is the increased cost in the paths and $C_0P'_1$ is the total increased cost. This cost $C_0$ could reflect increased unit cost at a supply point, i.e., $C_0$=cost of manufacturing (material cost, overhead, raw material, maintenance, depreciation, manpower, etc.). It is apparent that all costs relating to the finished quantity can be inserted as a fixed cost from a particular supply point and does not upset the analog computer's solution by adding such a quantity to one or to ($m$) supply generators.

A direct current (D.C.) analog computer of the present invention is shown in Fig. 1. Each of these supply points is represented by a constant current generator 10, 11, and 12 producing currents $i_1$, $i_2$, and $i_3$, respectively. In this problem there are two destination points which are here represented by constant current generators 13 and 14, producing constant current $i'_1$ and $i'_2$, respectively. The current generators are so arranged that currents $i_1$, $i_2$ and $i_3$, $i'_1$ and $i'_2$ all flow the same direction through the circuit. Connecting the supply points and the destination points and simulating transportation routes from each of the supply to each of the destination points are a plurality of highly conductive paths having negligible resistance. These conductive paths are provided by wire or other highly conductive electric leads, with a negligible amount of resistance. The output from the supply point node 10*a* is connected to the input of the destination point node 13*a* through conductive path 16 and to the input of destination point node 14*a* by conductive path 17. Conductive paths 18 and 19 connect supply point node 11*a* and destination points nodes 13*a* and 14*a*, respectively. Conductive paths 20 and 21 connect node 12*a* at supply simulating current generator 12 and nodes 13*a* and 14*a* at demand simulating generators 13 and 14, respectively. The currents which flow along these conductive paths are designated by double sub-script designators, the first sub-script digit designating the supply current from whence it comes and the second sub-script digit designating the demand current of which it is to become a part. Thus, current $i_{11}$ flows in conductor 16 from supply current $i_1$ to demand current $i'_1$, and current $i_{31}$ flows in the conductor 20 from supply current $i_3$ to demand current $i'_1$, etc. Each of these conductive paths contains a rectifier (22, 23, 24, 25, 26 and 27) which limits the flow of current through it to one direction from supply to destination point. Additionally, each of the lines has a voltage supply or battery (28, 29, 30, 31, 32, 33) which produces a constant potential that is adjustable to a value proportional to the cost of shipping from the point of shipment to the point of destination. These voltages are designated by the letter "$e$" with sub-scripts which correspond to the sub-script of the current in the same conductive path. Thus, battery 30 produces a voltage $e_{21}$ in the conductive path 18 between current generators 11 and 13, which produce currents $i_2$ and $i'_1$, respectively. Similarly, battery 33 produces the voltage $e_{32}$ in line 21. Completing the circuit, the input of the current generators 10, 11 and 12 are connected together and to 34 which provides a return path for current I from the output of current generators 13 and 14.

Considering the circuit of Fig. 1 now as a whole, it will be observed that constant currents from supply simulating generators flow along alternative routes 16—21 to constant current generators to satisfy current demanded, the units of current in each case simulating units of material being manufactured, shipped and demanded. The total supply in any established market is adjusted to be equal to the expected demand, and with the supply available known and expected demand known for each supply and demand point, the computer can be set up with currents proportional to the supply and demand at these points. The rectifiers merely assure that there is no tendency to reverse the flow of commerce. The batteries, however, have a biasing function representing the cost of shipment over their particular route in each case, which cost differs from route to route. There may be several alternative routes between supply points and a particular destination point, but only one route can be used between a given supply point and a given destination point. Although the minimum cost route is usually selected, for some reason another route may have to be used (e.g., because the preferred route is not passable during certain parts of the year, etc.). In addition, costs of shipping over a particular route may vary from time to time. Therefore, the voltages of the batteries are preferably made adjustable and are adjusted on the basis of known data at the time the computer is set up.

Figure 3:
Fig. 3 is a parallel resistor circuit shown to help illustrate the principle of operation of the internal network of the present invention.
Figure 4:
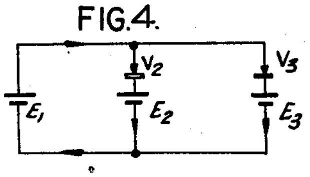
Fig. 4 is a schematic diagram of a circuit similar to the resistance circuit of Fig. 3, but employing a potential source and rectifier instead of the resistance in each parallel branch.

Figs. 3 and 4 are simple schematic circuit diagrams which illustrate in principle the operation of the internal network paths of the present invention, as exemplified by the circuit of Fig. 1. Fig. 3 is a familiar circuit in which resistances $R_1$ and $R_2$ are placed in parallel across voltage source E which, if it has high internal resistance compared to $R_1$ and $R_2$, will simulate a constant current source. Under these conditions, current will divide in $R_1$ and $R_2$ so as to produce a minimum dissipation of power. This results in a distribution of current inversely proportional to resistance or, in other words, the more resistance in one branch the more current that flows through the other. Fig. 4 is quite analogous in that it seeks a minimum power dissipation condition. Here, however, instead of resistances in the parallel branches, there are potential sources $E_2$ and $E_3$ of a minimum internal resistance in series with valves or rectifiers $V_2$ and $V_3$. The rectifiers are arranged to oppose any current to the primary high internal resistance current generator $E_1$, which would be generated by $E_2$ or $E_3$, and to avoid any possibility of circulating currents around the loop which includes $V_2$, $E_2$, $V_3$ and $E_3$. $E_2$ and $E_3$, however, remain effective to oppose currents which would tend to flow in their branches due to $E_1$, and the constant current which flows to the parallel branches divides in accordance with this opposition. Thus, as voltage $E_2$ is increased without increasing $E_3$, more current flows through the path containing $E_3$, all to the end that the total power is minimized.

Referring next to the A.C. version of an electrical computer shown in Fig. 2, it will be seen that the general circuit arrangement of Fig. 1 and the voltage and current designator have been preserved and the same number of supply and demand points are considered to further facilitate comparison. In this case, by definition the voltages and currents are not constant but by the term "A.C.," no particular form of wave is implied and the wave form selected may be of any repetitive form, such as sinusoidal wave, square wave, sawtooth or complex wave forms or repetitive pulses of various forms, etc., it being desirable that the waves, of whatever form, originate at a common source or be otherwise synchronized. Because of the convenience afforded in considering sine wave, with the same wave form being applicable to voltages and currents throughout, in describing the computer of Fig. 2 a wave of the general form $e=E_{max}$ sin $\omega t$ will be considered so that specific voltages will be defined as follows:

$$e_i=E_i \sin \omega t$$

$$\begin{cases} e_{ij}=E_{ij}\sin\omega t & 0<\sin\omega t\leq 1 \\ e_{ij}=0 & -1\leq\sin\omega t<0 \end{cases}$$

$$e'_i=E_i\sin(\omega t+\pi)$$

$$\begin{cases} i_i=I_i\sin\omega t & 0<\sin\omega t\leq 1 \\ i_i=0 & -1\leq\sin\omega t<0 \end{cases}$$

$$\begin{cases} i'_i=I'_i\sin\omega t & 0<\sin\omega t\leq 1 \\ i'_i=0 & -1\leq\sin\omega t<0 \end{cases}$$

$$\begin{cases} i_{ij}=I_{ij}\sin\omega t & 0<\sin\omega t\leq 1 \\ i_{ij}=0 & -1\leq\sin\omega t<0 \end{cases}$$

where E's and I's are defined as the maximum values of the sine wave, $\omega=2\pi f$ when $f$ is the computer operating frequency, and $t$ is time.

As in the computer of Fig. 1, the supply and demand points are simulated by constant current generators generally designated 40, 41 and 42 and 43 and 44, respectively and connected to the internal network portions by nodes 40*a*, 41*a*, 42*a*, 43*a* and 44*a*. These generators are preferably similar in construction and each in the form shown, includes a very high resistance 46, said resistance being of high impedance compared to other impedances outside current generators in the circuit so that it has the effect of holding constant current from the voltage coil 47. The voltage coil 47 is the secondary of a transformer whose primary 48 is connected through a supply voltage varying variable tap auto transformer or Variac 49 to a common voltage supply supplying all current generators the supply voltage $e_s$. As in the Fig. 1 computer, low impedance conductive paths 50, 51, 52, 53, 54 and 55 connect supply and destination points. In these paths are rectifiers 56, 57, 58, 59, 60 and 61, such as semi-conductor diodes, or the like, which are arranged to permit current to flow only from the supply to the destination points. Also in each of these conductive paths is a potential producing device 62, 63, 64, 65, 66 and 67 which adds a costing factor which opposes the flow of current through its path. Each of these devices is preferably composed of similar components including a resistance element 69, very small compared with the resistance 46, across which is impressed a voltage induced in secondary of transformer 70 and varied from the common supply voltage by a Variac 71. Also in the circuit with the secondary of transformer 70 and the resistance 69 is a rectifier 72 which functions in part to effect completion of wave forms similar to those resulting from the use of rectifiers 56—61. In addition, these rectifiers prevent conditions from arising, whereby under low supply or demand conditions, the reverse drive or flow might occur. The circuit is completed in this case by a conductive path 73 which connects together all the outputs of the destination current generators and all the inputs of the supply current generators.

The path resistances ($R_{ij}$), which are composed primarily of resistance 69, are kept to a minimum such that $$\sum_{i,j} R_{ij}i^2_{ij} \ll \sum_{i,j} e_{ij}i_{ij}$$

and hence by previous derivation $$P=\sum_{i,j} e_{ij}i_{ij} \text{ is a minimum}$$

where $e_{ij}$ and $i_{ij}$ have been previously defined. P is the average power and becomes by substitution of $e_{ij}$ and $i_{ij}$ $$P=\sum_{i,j}\frac{1}{2\pi}\int_0^\pi E_{ij}\sin\omega t\, I_{ij}\sin\omega t(d\omega t)$$

$$P=\sum_{i,j}\frac{1}{2\pi}\int_0^\pi E_{ij}I_{ij}\sin^2\omega t(d\omega t)$$

$$P=\sum_{i,j}\frac{E_{ij}I_{ij}}{4} \text{ is a minimum}$$

where $E_{ij}$ and $I_{ij}$ are the maximum positive values of the sinusoidal voltages and currents.

To reiterate, the power is minimized in the network of Fig. 2 as in the network of Fig. 1. The symbols are analogous to those defined under electrical analog computers and the currents at the junction points combine according to Kirchhoff's law. The voltages $e_1$, $e_2$, $e_3$, $e'_1$, and $e'_2$ are the voltage sources driving the corresponding currents $i_1$, $i_2$, $i_3$, $i'_1$, and $i'_2$. The resistors 46 ($R_1$) are chosen much larger than 69 ($R_{ij}$) i.e., $R_1 \gg R_{ij}$.

This A.C. computer (Fig. 2) can be operated in many different ways. One method of operation will be described but is not considered limiting in the computer's use.

The first step in the use of the computer is to establish conditions for operation. This is done by establishing voltage $e_s$ which is the voltage source for the $e_{ij}$'s. The magnitude of each path voltage ($e_{11}$, $e_{12}$, etc.) can be fixed at a specific value to simulate the desired cost for a particular problem. The dials on the Variacs 71, $V_{11}$, $V_{12}$, etc. can be calibrated directly in cost per unit for material to be transported. This makes it possible to set the cost directly on the calibrated dial. Next voltages $e_1$, $e_2$, $e_3$, $e'_1$, and $e'_2$ are seleced. The magnitude of these voltages are adjusted such that currents $i_1$, $i_2$, $i_3$, $i'_1$, and $i'_2$ correspond to the desired material flow. The adjustment of these voltages can be manual, as indicated, or automatic by means of a feedback device which senses the current and adjusts the voltage to the desired value such that the current is the value specified by the particular problem. Current generators in this computer are made up of voltage sources $e_1$, $e_2$, $e_3$, $e'_1$, and $e'_2$ with resistance $R_1$ in series with all voltages to produce current generators $i_1$, $i_2$, $i_3$, $i'_1$, and $i'_2$. Thus the series combination of $e_1$ and $R_1$ represent a current generating source. Other means of obtaining these currents are possible and this discussion is only to indicate a possible method. Although it is to be noted that diodes 56—61 are used only to restrict the direction of current flow from a point A to point D, particular problems may demand that bi-directional flow along some paths be desirable. A problem of this type can easily be solved on this computer.

Figure 5:
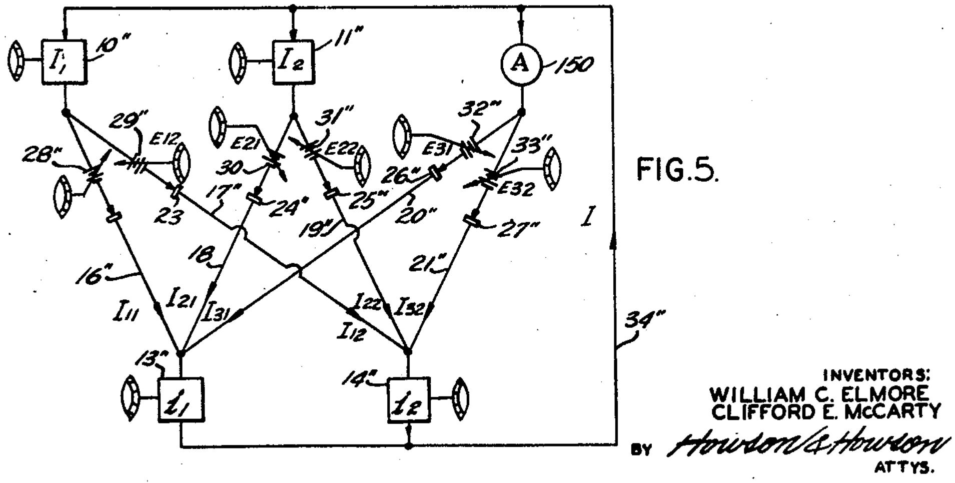
Fig. 5 is a schematic diagram similar to Fig. 1 but showing a modified circuit arrangement.

In actual use these computers might have more or less than the three supply points and might have more or less than the two destinations shown in Fig. 1 and Fig. 2. Any number of supplies and destination points are possible with a corresponding number of possible routes. An analog computer based on the principle of operation described might then be provided with a plurality of calibrated dials to modify the constant current output of the current generators corresponding to the factories at which a particular product is produced. These could be set to represent the production over a definite period, for example, a week. The demand current generators could have similar dials calibrated in units of weekly demand of the distribution centers and these can be set. Since supply equals demand, one of the current generators at either a supply or destination point could be replaced by a meter to measure the current as a check on the accuracy of the various settings, because it should read the difference between the total supply and the total demand settings of the generators. Fig. 5 shows one such arrangement in a circuit similar to that of Fig. 1 in which similar circuit elements are numbered as in Fig. 1 but with the addition thereto of double primes. The meter 150 is shown at an input terminal (supply point), but it will be appreciated that it could be placed, instead, at any other input or any other output terminal. The voltages are adjustable to any desired level by a voltage supply adjustment means shown in association with each battery, including a dial calibrated in terms of the analog of the voltage. Operating cost potentials could be set in a similar manner by dials calibrated directly in terms of unit cost of transportation. To obtain the optimum units to be shipped along a particular route, the current in the conductive path representing that route would have to be read and the ammeter for this purpose could be calibrated directly in the number of units to be shipped. It should be noted that there would be a maximum number N of routes which could be used and which would be equal to the sum of the number $n$ of shipping plus the number $m$ of destination points minus 1. The method of taking these readings could be varied considerably, and hence, it is not considered in detail in connection with the circuits shown.

Figure 6:
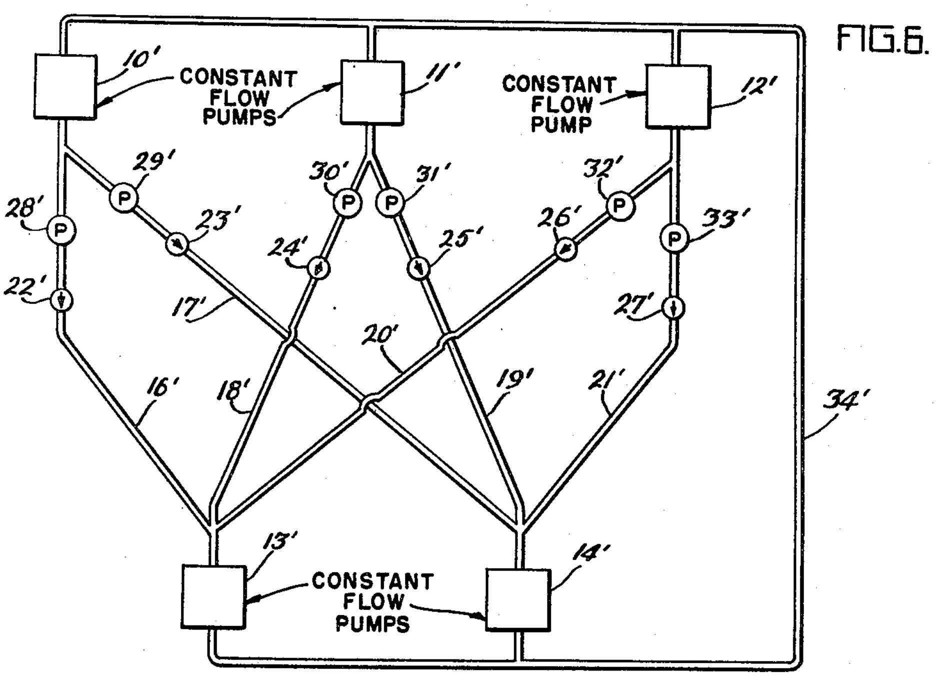
Fig. 6 is a schematic diagram of a computer of the present invention for solving the same problem as solved by the circuits of Figs. 1 and 2 but employing a hydraulic arrangement.

Fig. 6 shows a hydraulic analog which is quite similar to the electrical analog of Fig. 1 but which substitutes a flow of an incompressible fluid such as water for the flow of electricity. In order to further emphasize the similarity the same number of shipping points and destination points are used and similar numbers with the addition of primes indicate elements corresponding to elements in Fig. 1 and Fig. 2. Instead of conductors in this case, conduits for directing fluid flow are employed. Instead of constant current generators constant flow pumps are employed. Check valves take the place of rectifiers and constant pressure differential elements are used in place of the electrical potential or battery element. It will be noticed that the constant flow pumps 10', 11' and 12' representing the supply points produce flow in the same direction as constant flow pumps 13' and 14' representing destination points do. A return conduit 34' is connected between the destination points and the supply points as a fluid return, although a closed loop system is not essential since fluid can be drawn to supply points from a reservoir and emptied to waste or a reservoir after destination. The check valves 22'—27' prevent the reverse flow in conduits 16', 17', 18', 19', 20' and 21' and the pressure differential producing means 28'—33' serve the same biasing function as the batteries. The units of flow output from the pumps 10', 11' and 12' represent the supply available. The units of flow output from the constant flow pumps 13' and 14' represent the demand. The units of flow in the individual routes represent the traffic in units of material shipped over a particular route and the pressure differential represents the costing factor over that particular route. Thus, measurement of the rate of flow will serve to give a measurement of the traffic which passes over a particular route.

Three versions of the present invention under one particular set of conditions for the transportation problem have been considered. As previously mentioned it will be obvious to those skilled in the art that the present computer may have any number of supply and destination stations. It will also be clear to those skilled in the art that variations in the present invention using other media such as air in a pneumatic version, are possible, and all such variations of the present invention are intended to be within the scope and spirit thereof.

Figure 7:
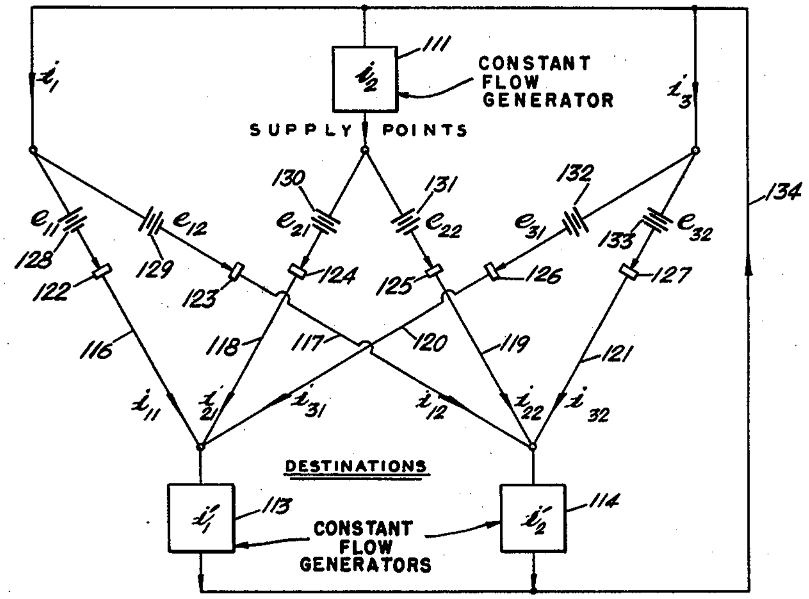
Fig. 7 is a schematic diagram of a modified form of the circuit shown in Fig. 1.

Various types of modification of the networks described can be effected without harm to the accuracy of the solution to the problem. Typical of the type of modification possible is the removal of one or more constant flow generators from either the demand points or nodes or the supply points or nodes. Fig. 7 illustrates such a modification as applied to the circuit of Fig. 1 wherein two of the three current generators at supply point nodes have been eliminated. In the form shown the device will determine not only the optimum distribution along routes from supply and demand points but also the best production for plants at the supply points, etc., in view of the known demand. In the drawing, elements similar to those of Fig. 1 have been designated by the number used in Fig. 1 plus 100. A measure of the current at the nodes from which generators have been omitted will be an indication of the supply required to fill the requirements of the demand points.

It will be obvious to those skilled in the art that the same type of generator elimination may be applied to any network or other analog having any number of supply and demand nodes. Moreover, demand may be determined equally well by the same process of generator elimination applied to the demand, rather than to the supply points. In either case, the number of generators eliminated depends upon the number of supply or demand points which have flexible capacities.

It should also be observed that simple elimination of generators will not take into account production costs at supplies or distribution costs at demand points. In order to do that potential supplies must be substituted for the generators, the potentials used being proportional to cost factors. The potential supplies may be added externally of the nodes directly in place of the generators or internally of the network in the flow paths. If added in the flow paths, they may be consolidated with the potential producing elements therein or kept separate provided in either event that all potentials added to each flow path beginning or ending at the node from which the generator is eliminated must be equal to one another. By making the added potential supplies variable, it is possible to obtain readings indicating the optimum production at different points required by a particular demand situation and the routes of supply or, alternatively, the optimum supply distribution based on a particular production potential. Then, iterative steps must be employed but by observation adjustments in the right direction to minimize overall cost can be observed so that the process is less tedious and difficult than many iteratively solved problems.

In addition to the situation in which supply equals demand, it is possible to simulate a condition of oversupply or overdemand. This is most simply done by substitution of a flow resisting element for a supply or a demand constant flow generator. This flow resisting element is then a sort of "slack" variable and may be thought of as a warehouse in the transportation problem.

It will be observed that in any version or embodiment of the invention some means is provided to assure flow in only one direction along its flow path. This means is intended to prevent a flow, which moves in the opposite direction from that intended, from so affecting the potential producing means that it becomes a driving force introducing an entirely new flow into the computer network. From this purpose, it will be obvious that this means, rectifier, etc., may be omitted or short circuited in a case where flow occurs only in the proper direction without a tendency to reverse. Moreover, even where flow might reverse if one of the means were omitted, if such omission does not permit the potential producing means to assume a driving function, it may be desirable in certain cases to omit at least one, and possible more, but not all, means for a particular set of operating conditions.

It should also be observed as initially noted that the computer of the present invention is not confined to a solution of the linear transportation equation. Other problems which can be set up in terms of linear simultaneous equations can also be solved, such as for example, the distribution of tools and/or labor along a plurality of production lines. Any linear problem requiring determination of distribution from sources to destinations in the presence of certain weighting factors for limited conditions of supply from each of a plurality of sources and total consumption at a predetermined number of destinations can be solved to determine, by the occurrence of an overall condition of maximum or minimum, the optimum distribution between the various sources and various destinations. The computer arrangement for such other problem does not differ materially from that of the linear transportation problem, and the recitation of the computer in the claims in terms of the linear transportation problem is intended by way of explanation for clarity and not by way of limitation.

In addition to the broadened use of networks heretofore described in terms of the linear transportation problem in the form described, these networks can be modified to solve other types of problems. One example of another type of problem which can be solved by networks of the general form of the present invention is the sequential scheduling problem previously generally defined.

Figure 8:
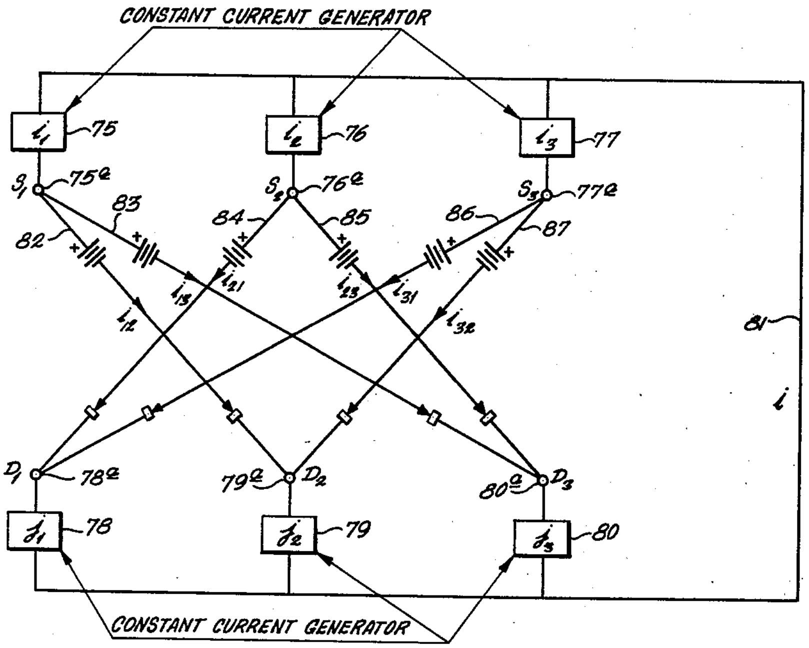
Fig. 8 is a schematic diagram of a computer of the present invention, employing a D.C. electrical network adapted for solution of a problem in the form of the sequence scheduling problem.

Referring to Fig. 8, a typical setup for the sequential scheduling problem is illustrated. It is characteristic of the setup in this case that there be the same number of input and output nodes. There are three constant current generators 75, 76 and 77 feeding current through the input nodes 75*a*, 76*a* and 77*a*, respectively. Likewise there are three constant current generators 78, 79 and 80 connected to the internal portion of the network through the output nodes 78*a*, 79*a* and 80*a*, respectively. Characteristically, the constant current generators are connected between their respective nodes and a common bus 81 external of the internal network. The internal network is composed of paths 82 and 83 from node 75*a* to nodes 79*a* and 80*a*, respectively, and representing the potential change-over from product 1 to either product 2 or product 3. There is no connection between terminals 75*a* and 78*a* because both of these represent product 1 and a change-over from product 1 to the same product would have no meaning. In the practical computer, a path connecting these two nodes would exist but would be provided, like all other paths, with a switch which would be open to eliminate that path from this particular computer setup. Connecting node 76*a* to nodes 78*a* and 80*a* are paths 84 and 85, respectively. Connecting nodes 77*a* to nodes 78*a* and 79*a* are paths 86 and 87, respectively. Each of the paths is provided with the usual potential producing means and flow rectifying means. The potential producing means in each path is adjusted to a potential proportional to the cost of change-over from the product at the input node to the product at the output node which its path joins. If it is desired to solve the problem of finding an optimum, or minimum cost sequential schedule in which each product is produced but once in the schedule, all constant current generators, both input and output, are set to equal values. The currents will distribute within the network such that the path between a particular input node and one of the output nodes represents the optimum path of that particular change. In the event of ambiguity because current exists in more than one path from a given input node to the output nodes, such ambiguity can be resolved by opening all but one of the paths so as to provide a unique set of paths equal in number to the number of products in the sequence. The optimum sequence is read from the analog computer simply by observing the paths in which current exists. For example, if in Figure 8, the currents $i_{13}$, $i_{32}$ and $i_{21}$ exist, all other internal currents being zero, the optimum sequential schedule involves changing from product 1 to product 3, then from product 3 to product 2, then from product 2 back to product 1, etc.

The problem of sequential scheduling, in which one or more products is produced more than one time in the sequence, can be solved by suitably setting the constant current generators. The details for such cases will not be discussed but should be obvious to the user of the computer.

Complex arrangements of the networks heretofore described are possible. In such arrangements, the internal portion of the network will be preserved while the external portion will be modified to incorporate other networks or the like. Thus, networks of the type described may be used in a sort of series arrangement or in parallel or in combination with other circuits. An example of a use of a series arrangement might be a situation in which jobbers, dealers or other middlemen receive and redistribute goods. Parallel or series-parallel arrangements might involve multiple products of a single manufacturer.

Certain modified forms of the present invention have been described. Others will occur to those skilled in the art. All such modifications within the scope and spirit of the claims are intended to be within the scope of the present invention.

We claim:

1. An analog computer comprising a network having two types of terminals, which are input and output terminals constituting network nodes, consisting of a flow path from various input to various output terminals, which flow paths constitute the internal portion of the network between the input and the output terminals, each flow path having a potential producing element, and flow rectifying elements in enough of the flow paths to prevent circulating currents within any loop internal of the input and output terminals which might otherwise be caused by the potential producing element, and a flow generator external of the internal portion of the network at at least one input node and a flow generator at at least one output node, whereby current in each of the paths may be measured by a suitable means in order to ascertain the value of the analog of said current.

2. An analog computer comprising a network having two types of terminals which are input and output terminals constituting network nodes, consisting of a flow path from various input to various output terminals, which flow paths constitute the internal portion of the network between the input and output terminals, each flow path having a potential producing element, and flow rectifying elements in enough of the flow paths to prevent circulating currents within any loop internal of the input and output terminals which might otherwise be caused by the potential producing element, and flow generators external of the internal portion of the network at at least one less than all of the nodes of one type of terminal and at at least one of the nodes of the other type, whereby current in each of the paths may be measured by a suitable means in order to ascertain the value of the analog of said current.

3. The computer of claim 2 in which an external return flow path is provided between any elements connected externally to the input and output terminals and any nodes which may not be so externally connected.

4. The analog computer of claim 3 in which flow generators are provided at all of the nodes of the one type.

5. The analog computer of claim 3 in which one node of the one type is connected to a flow resisting element and the other nodes of that type are connected to generators.

6. The analog computer of claim 3 in which potential producing elements are coupled externally of some of the nodes of the type only one of which must be coupled to a generator.

7. The analog computer of claim 3 in which the potential producing elements are added internally of flow paths connected to nodes of the type only one of which may be coupled to a generator other than those nodes of said type connected to generators, the potential added internally of each flow path from the same node being equal.

8. The analog computer of claim 2 in which a flow path of the type described extends from each input to each output terminal.

9. An analog computer comprising a network having two types of terminals, which are input and output terminals, constituting network nodes, consisting of a flow path from each input to each output terminal, which flow paths constitute the internal portion of a network between the input and output terminals, each flow path having a variable potential producing element, means for selectively interrupting flow in the flow path, and flow rectifying elements to prevent circulation currents due to the potential producing elements within any loop internal of the input and output terminals, variable flow generators external of the internal portion of the network at each of the nodes, and a common potential connection connecting together all of the flow generators so that the flow generator in each case lies between the common potential connection and its node.

10. The analog computer of claim 9 in which the flow paths are electrical flow conducting paths, the flow rectifying elements are current rectifiers, the means of opening the paths are electrical switches and the flow generators are constant current generators.

11. The analog computer of claim 10 in which the potential producing elements and the constant current generators produce D.C. potential and D.C. current respectively.

12. The analog computer of claim 10 in which the potential producing elements and the constant current generators produce A.C. voltage and A.C current, respectively, arranged to be in proper phase.

13. The analog computer of claim 9 in which the flow paths are fluid conduits, the constant flow generators and potential producing elements are pumps, the means of interrupting the flow are shut-off valves, and the flow rectifying elements are check valves.

14. An analog computer for solutions of problems of the general form of the transportation problem for determining optimum distribution to alternative routes for transportation of a stated number of units of goods from supply to destination points in order to minimize cost comprising constant flow devices to simulate supply points and destination points, flow paths of negligible resistance connecting supply and destination points, means to limit flow in each flow path to one direction such that the direction of flow is the same through supply and destination points, and each of said flow paths containing a potential producing device, the flow devices being adapted to produce a flow at each of the supply and destination points proportional to the supply of the goods at the supply point and to the demand for the goods at the destination points, respectively, and the potential in each flow path being proportional to the cost per unit of shipping the goods from the supply point to the destination point plus the same constant amount for each potential producing device.

15. The analog computer of claim 14 in which the flow of the constant flow devices is adjustable and may be varied to represent different amounts of goods demanded at demand points and different amounts of goods produced for the supply points and the potential of the potential producing devices may be varied to represent different costs per unit of goods.

16. The analog computer of claim 15 in which the variable constant flow devices are provided with dials calibrated in terms of units of goods and the potential producing devices are provided with dials calibrated in terms of cost per unit of goods.

17. The analog computer of claim 14 in which a meter is substituted for one of the constant flow devices and the flow into the supply is equal to the flow out of the demand point.

18. The analog computer of claim 14 in which the output of the demand points is coupled to the input of the supply points.

19. The analog computer of claim 14 in which the same constant amount for each potential device added to the amount proportional to the cost of shipping in each flow path is zero.

20. An analog computer for solution of problems of the general form of the transportation problem for determining optimum distribution to alternative routes for transportation of a stated total number of units of goods from supply points to destination points in order to minimize cost, comprising constant current generators positioned to simulate supply points and destination points and conductive paths of negligible resistance connecting supply and desination points, such that the direction of current flow in the same through supply and destination points, means in each of said paths capable of conducting current only in the direction from supply to destination points and a voltage source in each of said paths, the current generators being adapted to produce a current at each of the supply and destination points proportional to the supply of goods to be shipped from the supply points and proportional to the demand for goods at the destination points, respectively, and the voltage in each line being proportional to the cost per unit of shipping the goods from the point of shipment to the point of destination plus the same constant amount for each voltage source.

21. The analog computer of claim 20 in which the current produced by the constant current generators is variable to represent different amounts of goods available at the supply points and different amounts of goods required at demand points and the voltage of the voltage source being variable to represent different costs per unit of goods.

22. The analog computer of claim 21 in which the constant current generators are provided with dials calibrated in units of goods and a voltage source is provided with a dial permitting adjustment and calibrated in cost per unit of goods.

23. The analog computer of claim 20 in which a meter is substituted for one of the constant current generators, and the current out of the demand points equals the current into the supply points.

24. The analog computer of claim 20 in which the output side of the demand points is coupled to the input side of the supply points.

25. The analog computer of claim 20 in which the same constant amount added to the amount proportional to the cost of shipping in each conductive path is zero.

26. The analog computer of claim 20 in which all voltages and currents are direct current.

27. The analog computer of claim 20 in which all voltages are of the same frequency and synchronized and all currents are derived from said synchronized voltages.

28. The analog computer of claim 24 in which all voltages are obtained from a common voltage source.

29. An analog computer for solution of problems of the general form of the transportation problem for determining optimum distribution to alternative routes for transportation of a stated total number of units of goods from supply points to destination points in order to minimize cost, comprising constant flow pumps positioned to simulate supply points and destination points, fluid conduits of negligible resistance connecting supply and destination points such that the direction of fluid flow is the same in supply and destination points, a check valve in each of the fluid conduits such that said conduits are capable of carrying fluid only in the direction from supply to destination points and a fluid pressure producing element in each of said conduits, the pumps being adapted to produce flow at each of the supply and destination points proportional to the supply of goods to be shipped from the supply points and to the demand for goods at the destination points, respectively, and the pressure difference in each conduit being proportional to the cost per unit of shipping the goods from the supply point to the destination point plus the same constant amount for each fluid pressure producing element.

30. The analog computer of claim 29 in which the flow of the constant flow pumps is variable in order to represent different amounts of goods available at the supply points and different amounts of goods required at the demand points, and the pressure difference in each line is variable in order to represent different costs per unit of goods.

31. The analog computer of claim 30 in which the variable flow adjustment element of the constant flow pumps are provided with dials calibrated in units of goods, and the variable adjustment element of the pressure difference devices are provided with dials calibrated in terms of cost per unit of goods.

32. The analog computer of claim 29 in which a flow meter is substituted for one of the constant flow pumps and the output of the demand pumps is equal to the input of the supply pumps.

33. The analog computer of claim 32 in which the output of all of the demand pumps are coupled to the input of all the supply pumps so that total supply equals total demand.

34. The analog computer of claim 32 in which the same constant amount added to the amount proportional to the cost of shipping in each conductive path is zero.

35. The analog computer of claim 14 in which the same fixed amount of potential is added in each of these flow paths originating at the same supply point to the potential proportional to the cost of shipping.

36. The analog computer of claim 20 in which the same fixed amount of voltage is added in each of the conductive paths originating at the same supply point to the voltage proportional to the cost of shipping.

37. The analog computer of claim 29 in which the same fixed amount of fluid pressure is added in each of the fluid conduits originating at the same supply point to the fluid pressure proportional to the cost of shipping.

38. The analog computer of claim 14 in which at least one, but not all, of the means to limit flow in one direction in the flow paths is omitted under conditions such that the potential producing device in its flow path will not become a driving force to generate new flows in the computer.

39. The analog computer of claim 20 in which at least one, but not all, of the means capable of conducting current in only one direction in the conductive paths is omitted under conditions such that the voltage source in its flow path will not become a driving force to generate new currents in the network.

40. The analog computer of claim 29 in which at least one, but not all, of the means to limit flow in one direction in the fluid conduits is omitted under conditions such that the pressure producing element in its flow path will not become a driving force to generate new flows in the computer.

41. An analog computer for solution of problems of the general form of the transportation problem for determining optimum distribution from sources to destinations in the presence of certain weighting factors for limited conditions of supply from each of a plurality of sources and total consumption at a predetermined number of destinations whereby by the occurrence of an overall condition of maximum or minimum optimum distribution between the various sources and various destinations is attained comprising constant flow devices simulating sources and destinations the flow from which devices simulates the supplies from the various sources and the consumption at the various destinations, flow paths of negligible resistance connecting each of the sources to each of the destinations, means to limit flow in each flow path to one direction such that the direction of flow is the same through sources and destinations and a potential producing device in each of said conductive paths, the constant flow devices being adapted to produce a flow at each of the sources and destinations proportional to the units represented by flow, and the potential in each flow path being proportional to the factor weighting the flow of units.

42. An analog computer for solution of problems of the general form of the sequential scheduling problem for determining the optimum sequence of change-over from various products which must be made sequentially with the same facilities where the cost of change-over is known from one product to another and the sequence for obtaining the minimum cost is desired comprising constant flow devices to simulate products under manufacture and potential products to be next manufactured respectively, flow paths of negligible resistance connecting current generators representing products under manufacture and products to the manufacture of which the facility can potentially next be changed, means to limit the flow in each of the flow paths to one direction such that the direction of flow is the same through both generators representing products under manufacture and generators representing the next potential product, and each of said flow paths containing a potential producing device, the flow generators being adapted to produce a flow in each of the flow paths representing change-over from products currently being manufactured to products potentially next to be manufactured, and the potential opposing flow in each flow path being proportional to the cost of change-over from the particular unit being manufactured to the potential next item of manufacture.

43. The analog computer of claim 42 in which the flow devices are constant current generators and the means to limit flow to one direction are rectifiers.

44. The analog computer of claim 43 in which the constant current generators and potential producing devices produce D.C. current and voltage respectively.

45. The analog computer of claim 43 in which the constant flow generator and potential producing device are A.C. current and A.C. voltage producing devices, having proper phasing relative to one another to achieve the desired effect.

46. The analog computer of claim 42 in which the constant flow generators and the potential producing means are pumps and the means limiting direction of flow in the flow paths are check valves, the flow paths themselves being suitable fluid conduits.

47. An analog computer comprising a network having two types of terminals, which are input and output terminals, constituting network nodes, consisting of a flow path from each input to each output terminal, which flow paths constitute the internal portion of a network between the input and output terminals, each flow path having a variable potential producing element, means for selectively interrupting flow in the flow path, and flow rectifying elements to prevent circulation currents due to the potential producing elements within any loop internal of the input and output terminals and, external of the internal portion of the network, at least one flow generator connected to at least one of the input nodes and at least one flow generator connected to at least one of the output nodes, and a common potential connection connecting together all of the flow generators as well as any node not connected externally to a flow generator, each such flow generator lying between the common potential connection and its node.

48. The analog computer of claim 47 in which one node not having flow generator connected externally thereto is connected to a flow-resisting element.

No references cited.